Feb. 19, 1946.  A. G. FORSYTH  2,395,262
SUPERCHARGING ARRANGEMENT
Filed June 9, 1942   2 Sheets-Sheet 1
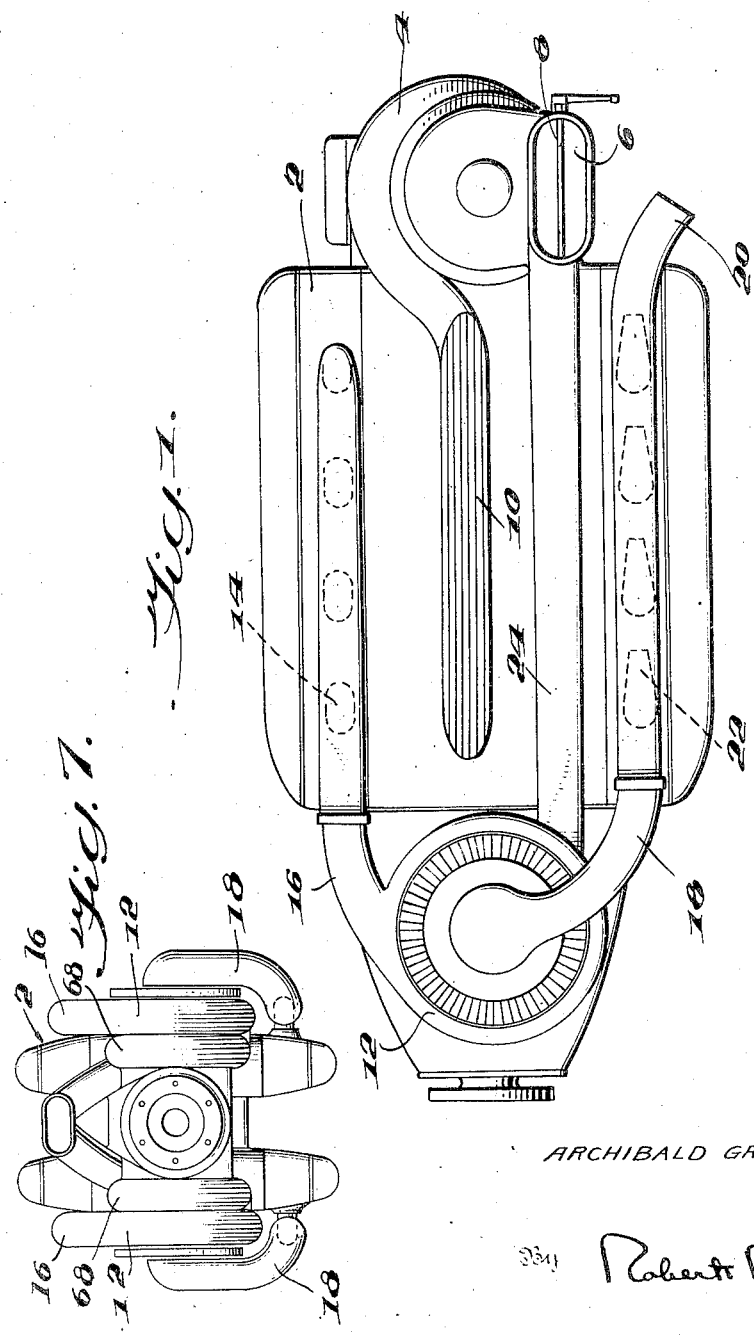
Inventor
ARCHIBALD GRAHAM FORSYTH,
Robert B Pearson
Attorney

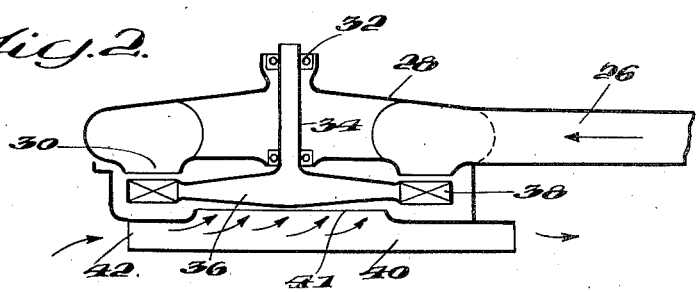
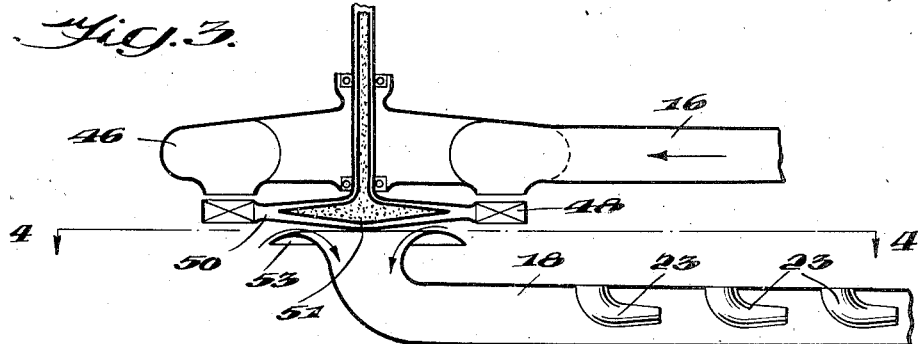
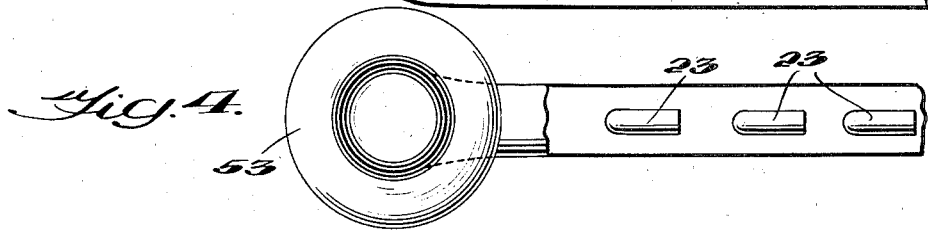
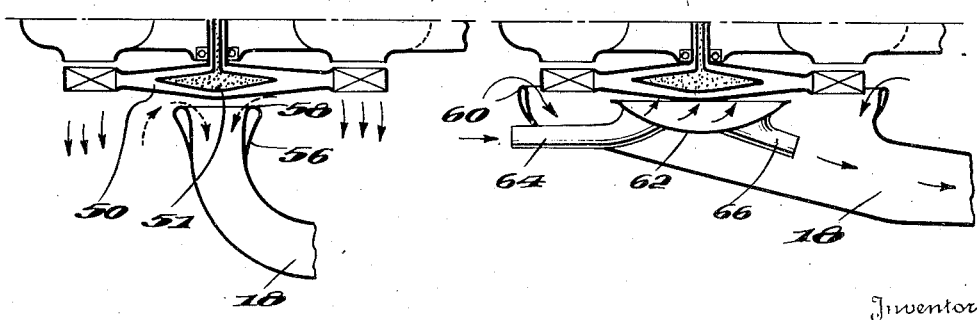
Inventor
ARCHIBALD GRAHAM FORSYTH,
By Robert B Pearson
Attorney Patented Feb. 19, 1946

2,395,262

UNITED STATES PATENT OFFICE 2,395,262

SUPERCHARGING ARRANGEMENT

Archibald Graham Forsyth, Cheam, England, assignor to The Fairey Aviation Company Limited, Hayes, Middlesex, England Application June 9, 1942, Serial No. 446,376

5 Claims. (Cl. 60—13)

This invention relates to turbo-exhaust superchargers for internal combustion engines for aircraft and the like.

In aircraft power plants it has become necessary to provide means for increasing the intake pressures for the engine, or for maintaining the pressure substantially at ground atmospheric pressure when the aircraft is flying at high altitude. For this purpose engines have been equipped with superchargers which serve to compress atmospheric air, increasing its density, whereby greater power may be obtained from the engine. One type of supercharger for this purpose has generally been comprised of a turbine actuating a compressor or blower, the air compressed thereby being returned to the intake of the engine.

The present invention relates to such superchargers and particularly to an improved arrangement for increasing their efficiency. It is a principal object of the invention to provide such an arrangement.

One of the disadvantages of turbo-exhaust superchargers is that the rotor and the turbine blades become very hot and consequently soon deteriorate. It is an object of the invention to provide improved means for cooling the rotor.

Still another object of the invention resides in reducing the pressure on the exit side of the turbine, thus increasing the efficiency of the supercharger.

These and further objects will become more apparent from the following description and claims when read in conjunction with the accompanying drawings, in which:

Figure 1 is a side elevation of an internal combustion engine provided with a turbo-exhaust supercharger in accordance with the invention.

Figure 2 is a horizontal sectional view showing a known type of cooling arrangement for turbo-exhaust superchargers.

Figure 3 is a horizontal sectional view of a supercharger constructed in accordance with the invention.

Figure 4 is a view on the line 4—4 of Figure 3.

Figure 5 is a view similar to Figure 3 but showing a modified form of the invention.

Figure 6 is a similar view of another embodiment, and

Figure 7 is a front elevation of the engine shown in Fig. 1.

Referring specifically to the drawings, Figure 1 shows an internal combustion engine 2, provided with a supercharger 4 which may be driven mechanically by the rear end of the crankshaft of the engine. This supercharger is provided with an air intake opening 6 controlled by a throttle valve 8. The supercharger 4 is adapted to draw air through the intake opening 6 and to discharge it through the air intake manifold 10 to the engine 2.

Mounted on the front of the engine by any suitable means is a turbo-exhaust supercharger 12, the details concerning which will be described hereinafter. This supercharger is supplied with exhaust gases from the upper exhaust ports 14 of the engine and these exhaust gases travel through the manifold 16 to drive the turbine blades of the supercharger 12. Disposed adjacent the rotor carrying the turbine blades is a manifold 18 which is open at its rear end 20. The lower exhaust ports 22 of the engine are provided with ejectors 23 disposed in the manifold 18 so as to direct the gases discharged from these ports rearwardly through the manifold and out the opening 20. The nature and purpose of the manifold 18 will be defined in more detail later.

As is customary, the rotation of the turbine blades drives a compressor 68 (see Fig. 7) and the air compressed thereby is directed through a passage 24 to the mechanically driven supercharger 4.

As is indicated in the recitation of the objects of the invention, the improvement relates particularly to means for cooling the turbine blades of the turbo-exhaust supercharger 12 more efficiently. By way of illustrating the improvement more clearly, Figure 2 shows a known turbo-exhaust supercharger arrangement provided with an intake manifold 26 for exhaust gases, which manifold terminates in a circular housing 28 provided with a laterally disposed annular exit opening 30. The housing 28 is provided with bearings 32 for a shaft 34 carrying the rotor 36, the outer periphery of the rotor bearing the turbine blades 38. The turbine blades are disposed directly adjacent the annular opennig 30 so that exhaust gases passing through the opening are directed against the blades, thus turning the rotor. While it is not shown, the shaft 34 at its other end is adapted to drive a compressor, for purposes already indicated.

Disposed adjacent the rotor is an air conduit or pipe 40 having an enlarged portion with a circular opening 41 adjacent the rotor and about the size thereof. The air conduit 40 has a forward opening 42 which is adapted to receive air as the plane moves forwardly, and this air, because of the opening 41, is in contact with the rotor 36 for the purpose of cooling it, after which it passes through the rear end of the air conduit 40.

The present invention constitutes an improvement over such an arrangement. One embodiment of the invention is illustrated in Figures 3 and 4. As in known arrangements this embodiment includes a manifold 16 receiving the exhaust gases from the upper exhaust ports of the engine and directing these gases to a housing 46, similar to that indicated by the reference numeral 28 in Figure 2. These exhaust gases are directed against the turbine blades 48 mounted on the periphery of the rotor 50. In this instance, however, the rotor 50 is provided with an interior space 51 filled with sodium or the like to effect cooling of the rotor. The space 51 also extends upwardly inside the rotor shaft.

Instead of the customary air conduit 40 of Figure 2, the invention employs an air conduit 18, the inner end 53 of which is flared to give it a trumpet shape, with the opening disposed directly adjacent the rotor and concentric therewith. The diameter of the trumpet-shaped end 53 is approximately the diameter of the rotor 50 proper, excluding the turbine blades 48.

With this arrangement air is drawn past the turbine blades and into the air passage 18 as indicated by the arrows. The lower exhaust ports of the engine are provided with jet ejectors 23 which extend into the air passage 18. These jets have their exhaust openings disposed rearwardly so that the expulsion of exhaust gases therethrough tends to draw air and some of the exhaust gases into the air passage 18 due to the high velocity of the exhaust from the ejectors.

Figure 4 is a view on the line 3—3 of Figure 3 and also shows the trumpet-shaped opening and the disposition of the jets 23 in the air passage 18.

With this arrangement, the rotor is effectively cooled by the sodium in the space 51 and the rotor proper 50 is effectively cooled by the cooling air as it is drawn into the trumpet-shaped end 53 of the air conduit 18.

The embodiment illustrated in Figure 5 is similar to that of Figures 3 and 4 except for the shape of the end of the air conduit 18. In this instance the end, instead of being trumpet-shaped as in the embodiment of Figures 3 and 4, has a diameter substantially equal to that of the rest of the air conduit. The end is bent back upon itself as indicated at 56, so as to provide a rounded edge 58.

The exhaust gases passing through the turbine blades are directed as indicated by the arrows in full lines, while the cooling air passes in contact with the rotor to cool the same and thence into the air conduit 18 as indicated by the arrows in dot and dash lines. As in the embodiment of Figures 3 and 4, the rotor 50 and its shaft are provided with an interior space 51 filled with sodium or the like for the purpose of cooling the rotor.

In the modification of Figure 6 the air conduit 18 is provided with a very large end 60 of a diameter greater than the rotor including the turbine blades. With such an arrangement the exhaust gases passing through the turbine blades, as well as air which may enter the enlarged end as indicated by the arrows, are drawn into the air conduit 18. So that sufficient air will reach the rotor for cooling purposes, a dish-shaped member 62 is disposed within the enlarged end of air conduit 18 directly adjacent the rotor. Entering the dish-shaped member on the forward side (in the direction of flight) is a pipe 64 which passes through the enlarged end of air conduit 18 to receive a supply of air as the plane moves forwardly. An exit pipe 66 fixed to the dish-shaped member 62 directs the air into the air conduit 18.

As in the previous embodiments, the air conduit 18 has jet ejectors 23 mounted therein, which ejectors are directly connected with the lower exhaust ports of the engine.

This modification possesses the advantage of increased efficiency in the operation of the rotor, in addition to an effective cooling of the rotor and the turbine blades. The increased efficiency is effected by reason of the fact that the ejectors 23 cause a condition of lower pressure in the air conduit 18 than exists in the housing 46. In other words, there is, because of the arrangement described, a considerable reduction of the back pressure on the exhaust side of the turbine. Consequently less energy is required in driving the rotor.

All of the embodiments of the invention provide effective cooling means for the rotor, and consequently the invention effects a considerable improvement in exhaust-turbo superchargers for use on aircraft and the like.

While in the above description there have been disclosed practical and efficient embodiments of the invention, it should be well understood that the invention is not limited to these embodiments, as there might be changes in the arrangement, disposition, and form of the parts without departing from the principle of the invention as comprehended within the scope of the appended claims.

I claim:

1. Cooling means for a turbo-supercharger having a rotor carrying turbine blades, said means comprising, a pipe open at both ends, one of said ends facing said rotor but slightly spaced therefrom, said end being disposed concentric to the axis of rotation of said rotor, said pipe end being trumpet-shaped and having a diameter substantially that of said rotor exclusive of the turbine blades, and jet means opening within said pipe in a direction away from said rotor, said jet means being adapted to be connected to some of the exhaust ports of the internal combustion engine with which the supercharger is used.

2. Cooling means for a turbo-supercharger having a rotor carrying turbine blades, said means comprising, a pipe open at both ends, one of said ends facing said rotor but slightly spaced therefrom, said end being disposed concentric to the axis of rotation of said rotor, said pipe end having a rounded enlarged edge and having a diameter less than that of the rotor exclusive of the turbine blades, and jet means opening within said pipe in a direction away from said rotor, said jet means being adapted to be connected to some of the exhaust ports of the internal combustion engine with which the supercharger is used.

3. A supercharger system for internal combustion engines, having upper and lower banks of cylinders each provided with a set of exhaust openings, a turbo-exhaust supercharger, said supercharger including a chamber having an annular opening, passage means connecting one set of said exhaust openings with said chamber, a rotor having turbine blades disposed adjacent said annular opening to receive the force of exhaust gases passing therethrough, whereby the rotor is rotated, conduit means having one end disposed adjacent and concentric with respect to said rotor, and jet means connected with said other set of exhaust openings and opening into said passage means in a direction away from said rotor.

4. In combination, an internal combustion engine having two sets of exhaust ports, a turbo-exhaust supercharger carried by said engine, said supercharger having a rotor with turbine blades carried thereby, conduit means connecting one set of the engine exhaust ports to said supercharger for supplying exhaust gases to the turbine blades to drive said rotor, a pipe open at both ends, one end of said pipe facing but spaced from said rotor and being disposed concentric with respect to the axis of rotation of said rotor, and means for directing exhaust gases from the other set of exhaust ports of said engine into said pipe intermediate its ends and in a direction away from said rotor, the pipe end facing said rotor being trumpet-shaped and having a diameter substantially equal to that of the rotor excluding the turbine blades.

5. In combination, an internal combustion engine having two sets of exhaust ports, a turbo-exhaust supercharger carried by said engine, said supercharger having a rotor with turbine blades carried thereby, conduit means connecting one set of the engine exhaust ports to said supercharger for supplying exhaust gases to the turbine blades to drive said rotor, a pipe open at both ends, one end of said pipe facing but spaced from said rotor and being disposed concentric with respect to the axis of rotation of said rotor, and means for directing exhaust gases from the other set of exhaust ports of said engine into said pipe intermediate its ends and in a direction away from said rotor, said pipe end which faces said rotor having a rounded edge, the diameter of said pipe end being less than the diameter of the rotor proper, excluding the turbine blades.

ARCHIBALD GRAHAM FORSYTH.